United States Patent
Maharaja et al.

(10) Patent No.: US 12,489,463 B2
(45) Date of Patent: Dec. 2, 2025

(54) SYSTEM AND METHOD TO DYNAMICALLY ABBREVIATE DATA

(71) Applicant: Bank of America Corporation, Charlotte, NC (US)

(72) Inventors: Raja Arumugam Maharaja, Chennai (IN); Sonali Tiwari, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/628,219

(22) Filed: Apr. 5, 2024

(65) Prior Publication Data
US 2025/0317155 A1   Oct. 9, 2025

(51) Int. Cl.
G06F 16/31 (2019.01)
G06F 7/58 (2006.01)
G06F 16/35 (2025.01)
H03M 7/30 (2006.01)

(52) U.S. Cl.
CPC .............. *H03M 7/55* (2013.01); *G06F 7/588* (2013.01); *G06F 16/31* (2019.01); *G06F 16/35* (2019.01); *H03M 7/6035* (2013.01)

(58) Field of Classification Search
CPC ................................ G06F 16/31; G06F 16/35
USPC ........................................................ 707/693
See application file for complete search history.

(56) References Cited

U.S. PATENT DOCUMENTS

| | | |
|---|---|---|
| 7,483,581 B2 | 1/2009 | Raveendran et al. |
| 8,275,897 B2 | 9/2012 | Fallon |
| 9,710,493 B2 | 7/2017 | Wang et al. |
| 10,540,146 B1 | 1/2020 | Vakili |
| 10,802,800 B1 | 10/2020 | Vakili |
| 11,016,995 B2 | 5/2021 | Park et al. |
| 11,442,697 B2 | 9/2022 | Huang et al. |
| 2003/0012431 A1 | 1/2003 | Irvine et al. |
| 2003/0039396 A1 | 2/2003 | Irvine et al. |
| 2006/0010151 A1 | 1/2006 | Star Sung |
| 2006/0104526 A1 | 5/2006 | Gringeler et al. |
| 2008/0018743 A1 | 1/2008 | Oh et al. |

(Continued)

FOREIGN PATENT DOCUMENTS

| | | |
|---|---|---|
| CN | 108280491 B | 7/2018 |
| CN | 111830506 B | 2/2022 |

(Continued)

*Primary Examiner* — Kimberly L Wilson (57) ABSTRACT

A system comprises a memory communicatively coupled to at least one processor. The at least one processor is configured to receive a request to store received data, determine whether the received data comprises unstructured data, evaluate the unstructured data of the received data in accordance with a machine learning algorithm in response to determining that the received data comprises the unstructured data, and perform an analysis operation to identify datapoints in the received data in response to evaluating the unstructured data of the received data. The datapoints may be a signature representation of the unstructured data of the received data. Further, the at least one processor may be configured to generate a roadmap to store the datapoints and store the datapoints following the roadmap. The roadmap is a plan to store the datapoints in the memory in accordance with one or more quantum random number generator (QRNG) operations.

20 Claims, 2 Drawing Sheets

(56) References Cited

U.S. PATENT DOCUMENTS

| | | |
|---|---|---|
| 2020/0349460 A1 | 11/2020 | Levin |
| 2020/0387565 A1* | 12/2020 | Caglar ................... G06N 3/082 |
| 2020/0403787 A1 | 12/2020 | Islam et al. |
| 2022/0108318 A1* | 4/2022 | Ramasamy ............ G06N 5/045 |
| 2023/0224148 A1 | 7/2023 | Newton et al. |
| 2024/0119175 A1* | 4/2024 | Middleton ........... G06N 3/0895 |

FOREIGN PATENT DOCUMENTS

| | | | |
|---|---|---|---|
| JP | 2021180038 A | 11/2021 | |
| WO | WO-2019203718 A1 * | 10/2019 | ......... G06F 16/2246 |

\* cited by examiner

SYSTEM AND METHOD TO DYNAMICALLY ABBREVIATE DATA

TECHNICAL FIELD

The present disclosure relates generally to abbreviation operations, and more specifically to a system and method to dynamically abbreviate data.

BACKGROUND

In communication systems, unstructured data refers to data that is not organized and does not have fixed data models. The term unstructured data may refer to information that does not fit in traditional databases. The communication systems may be challenged to store, maintain, and/or analyze the unstructured data because the unstructured data is hard to sort, manage, and organize. As a result, redundant copies of specific unstructured data may be stored in a same database.

SUMMARY OF THE DISCLOSURE

In one or more embodiments, systems and methods are configured to dynamically abbreviate data. In particular, the system may be configured to train a machine learning (ML) model to generate one or more roadmaps comprising storage plans for specific types of data (e.g., unstructured data and/or structured data) over time. In the case of unstructured data comprising textual data, the ML model may be trained to identify data in text strings, assort the data in quantum registers, and prevent repeated data from being saved in the registers. In the case of structured data comprising image data, the ML model may be trained to identify data in an image, assort the data in clusters of information, and prevent repeated data from being saved in the clusters. The ML model may generate roadmaps comprising depiction plans that identify datapoints in images for storage. The datapoints may be information representative of the images. In some embodiments, the datapoints may be a signature representation of the images. For the unstructured data, the datapoints may include content information in the form of numbers. For the structured data, the datapoints may include content information indicating objects in the image data, colors in the image data, and pixel density information, among others.

In one or more embodiments, the system described herein are integrated into a practical application of dynamically abbreviating unstructured data and/or structured data. In particular, the system may be configured to execute an ML algorithm that causes the system to determine whether received data comprises unstructured data and/or structured data and abbreviating the data based on type of data. Further, the system is configured to store unique information associated with the abbreviated data. In this regard, the system is configured to leverage quantum registers and containerized clustering to dynamically determine whether unstructured data and/or structured data are previously stored in a database.

In one or more embodiments, the system is directed to improvements in computer systems. Specifically, the system reduces processor and memory usage in servers and/or user devices by storing datapoints of the unstructured data and/or the structured data. In this regard, memory usage is reduced because datapoints representative of certain data types are stored at any given time instead of the data itself. These datapoints consume fewer memory resources than the underlying data itself. For example, a representation of an image received in one or more data streams may be saved as one or more corresponding datapoints instead of saving the image received in the one or more data streams. Further, the system is configured to reduce and/or eliminate redundant copies of data in the database. The system may be configured to reduce and/or prevent duplicate datapoints from being saved in the memory. For example, the system may be configured to store only one set of datapoints representative of an image received a first time. In this regard, if the image is received a second time, the datapoints of the image will not be stored in the memory again. There may not be redundant copies of unstructured data and/or structured data in the database when datapoints are previously stored in the memory.

In one or more embodiments, the system may comprise an apparatus, such as the server. Further, the system may be a data exchange system, which comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured to evaluate data in accordance with one or more machine learning models. The at least one processor may be configured to receive a request to store received data, determine whether the received data comprises unstructured data, evaluate the unstructured data of the received data in accordance with the machine learning algorithm in response to determining that the received data comprises the unstructured data, and perform an analysis operation to identify datapoints in the received data in response to evaluating the unstructured data of the received data. The datapoints may be a signature representation of the unstructured data of the received data. Further, the at least one processor may be configured to generate a roadmap to store the datapoints and store the datapoints following the roadmap and store the datapoints following the roadmap. The roadmap may be a plan to store the datapoints in the memory in accordance with one or more quantum random number generator (QRNG) operations. The one or more QRNG operations may be configured to convert the datapoints into multiple intermediate values. The one or more QRNG operations may be configured to index the intermediate values as indexed data.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
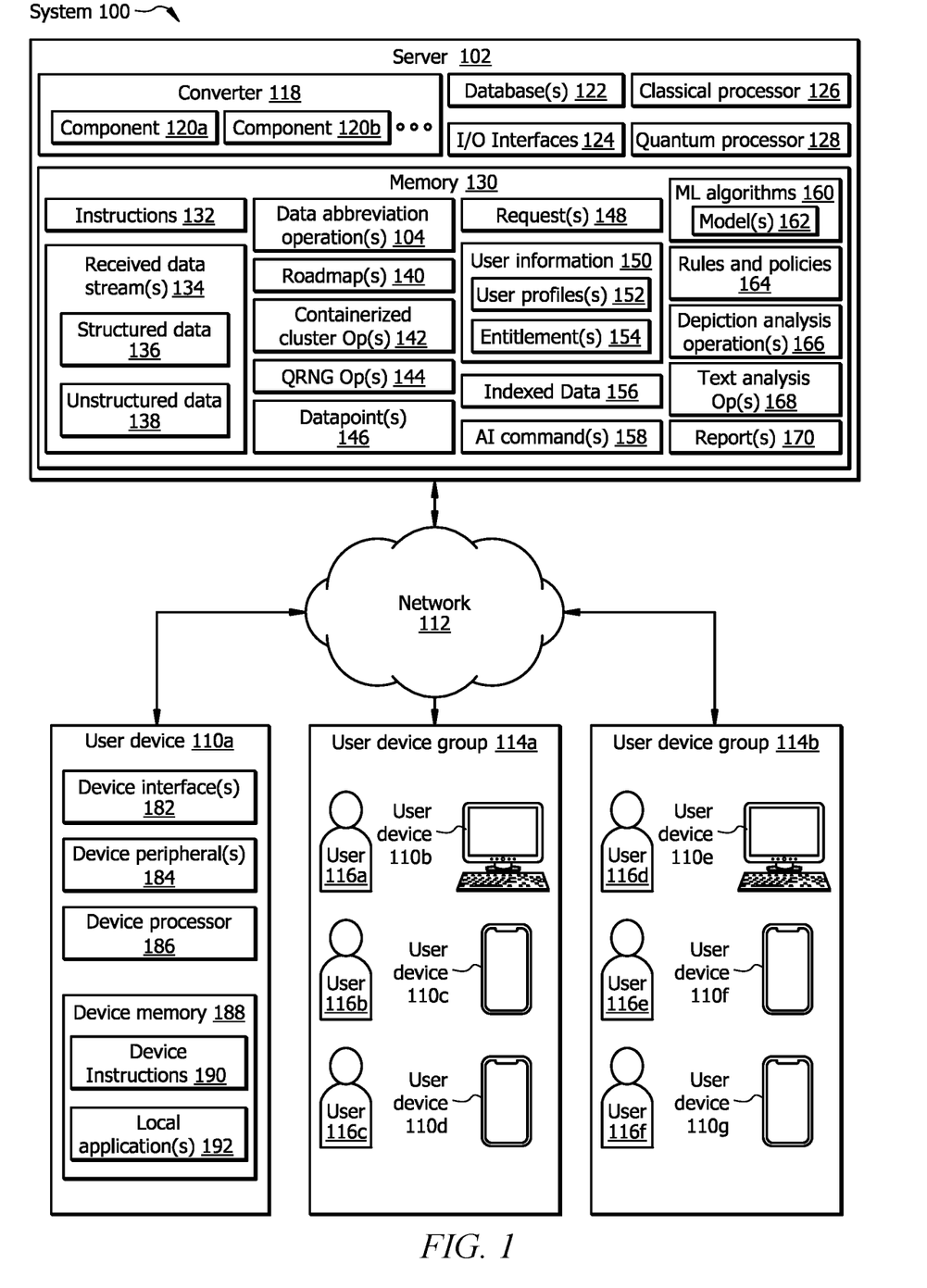
FIG. 1 illustrates a system in accordance with one or more embodiments.
Figure 2:
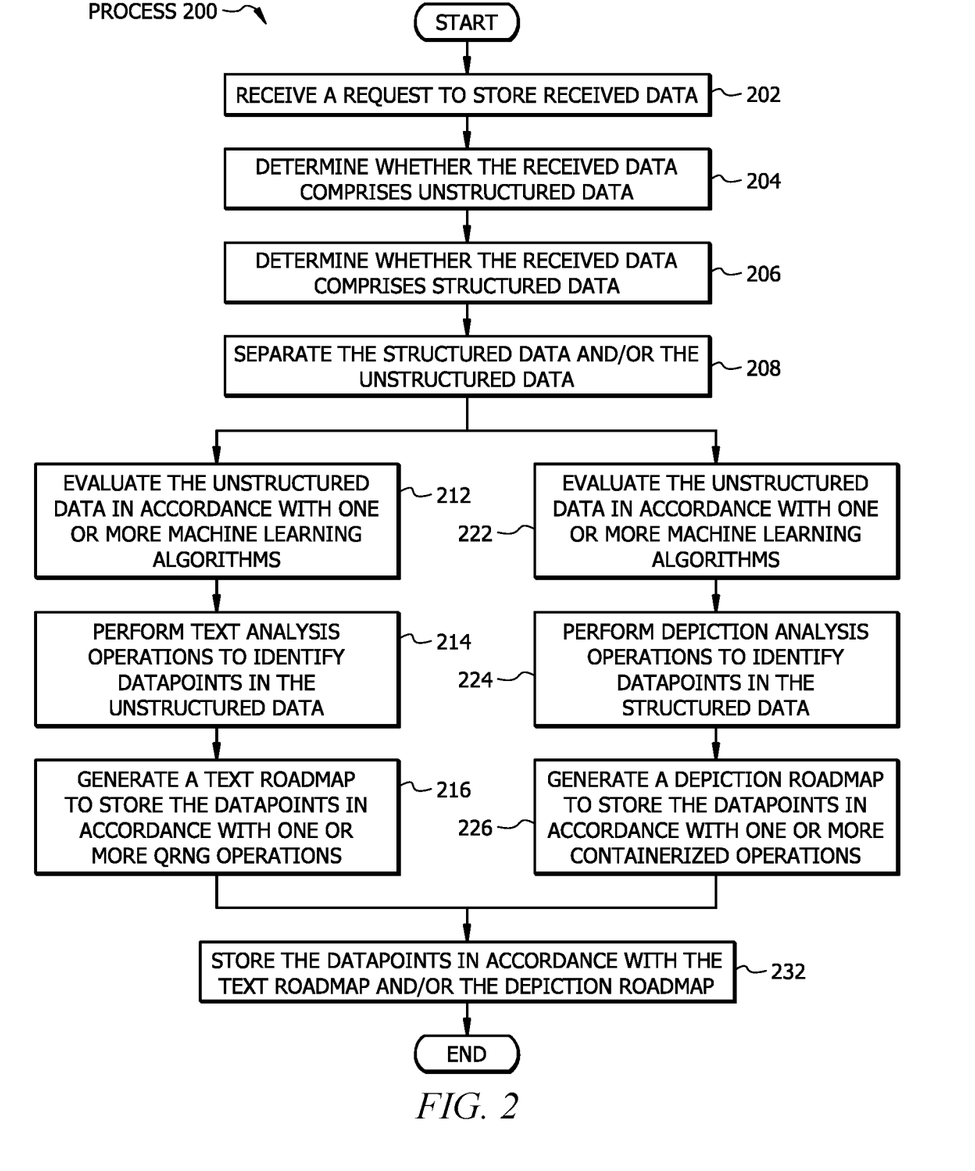
FIG. 2 illustrates an example flowchart of a method to dynamically abbreviate data in accordance with one or more embodiments.

As described above, this disclosure provides various systems and methods configured to dynamically abbreviate data. FIG. 1 illustrates a system 100 in which a server 102 performs one or more data abbreviation operations 104. FIG. 2 illustrates a process 200 performed by the system 100 of FIG. 1.

System Overview

FIG. 1 illustrates an example system 100, in accordance with one or more embodiments. The system 100 may comprise a server 102 configured to perform one or more data abbreviation operations 104. The system 100 includes a server 102 communicatively coupled to a user device 110a, a user device 110b, a user device 110c, a user device 110d, a user device 110e, a user device 110f, and a user device 110g (collectively, user devices 110) via a network 112. The user devices 110 may be working nodes configured to receive instructions to perform one or more data abbreviation operations 104 based on instructions received from the server 102. In some embodiments, some of the user devices 110 may be clustered together in a user device group 114a and a user device group 114b (collectively, user device groups 114). Each of the user devices 110 may be associated with one or more corresponding operators. These operators are shown as a user 116a, a user 116b, a user 116c, a user 116d, a user 116e, and a user 116f (collectively, users 116) in the user device groups 114. In FIG. 1, the user group 114a is shown comprising the user 116a associated with the user device 110b, the user 116b associated with the user device 110c, and the user 116c associated with the user device 110d. Further, the user group 114b is shown comprising the user 116d associated with the user device 110e, the user 116e associated with the user device 110f, and the user 116f associated with the user device 110g.

In one or more embodiments, the server 102 may comprise a converter 118 comprising a component 120a and a component 120b (collectively, components 120), one or more databases 122, one or more server input (I)/output (O) interfaces 124, at least one classical processor 126, at least one quantum processor 128, and at least one memory 130 communicatively coupled to one another. In some embodiments, the memory 130 may comprise instructions 132, one or more received data streams 134 comprising structured data 136 and structured data 138, one or more data abbreviation operations 104, one or more roadmaps 140, one or more containerized cluster operations 142, one or more (QRNG) operations 144, one or more sets of datapoints 146, one or more requests, user information 150 comprising one or more user profiles 152 and one or more entitlements 154, one or more indexed data 156, one or more artificial intelligence (AI) commands 158, one or more machine learning (ML) algorithms 160 configured to train one or more ML models 162, one or more rules and policies 164, one or more depiction analysis operations 166, one or more text analysis operations 168, and one or more reports 170.

Referring to the user device 110a a non-limiting example, the user device 110a may comprise one or more device interfaces 182, one or more device peripherals 184, at least one device processor 186, and at least one device memory 188 communicatively coupled to one another. The device memory 188 may comprise device instructions 190 and/or one or more local applications 192.

System Components

Server

The server 102 is generally any device or apparatus that is configured to process data and communicate with computing devices (e.g., the user devices 110), additional databases, systems, and the like, via the one or more server I/O interfaces 124 (i.e., a user interface or a network interface). The server 102 may comprise the classical processor 126 that is generally configured to oversee operations of the processing engine. The operations of the processing engine are described further below in conjunction with the system 100 described in FIG. 1 and the process 200 described in FIG. 2.

The server 102 comprises multiple databases 122 configured to provide one or more memory resources to the server 102 and/or the user devices 110. The server 102 comprises the classical processor 126 and the quantum processor 128 communicatively coupled with the converter 118, the databases 122, the server I/O interfaces 124, and the memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to function as a halfway point in between one or more services and other tools or databases.

The converter 118 is configured to convert data items represented by classical binary bits to quantum bits. The converter 118 is further configured to convert data items represented by quantum bits to classical binary bits. In certain embodiments, the converter 118 comprises a plurality of components 120 that are configured to generate and manipulate quantum bits. In the illustrated embodiment, the plurality of components 120 and the quantum processor 128 are configured to operate on a same type of quantum bits. For example, when the quantum processor 128 comprises a photon-based device (with qubits implemented by modes of photons), the plurality of components 120 may comprise optical components such as lasers, mirrors, prisms, waveguides, interferometers, optical fibers, filters, polarizers, and/or lenses.

In one or more embodiments, the server I/O interfaces 124 may be configured to enable wired and/or wireless communications. The server I/O interfaces 124 may be configured to communicate data between the server 102 and other user devices (i.e., the user devices 110), network devices (i.e., routers in the network 112), systems, or domain(s) via the network 112. For example, the server I/O interfaces 124 may comprise a WI-FI interface, a LAN interface, a WAN interface, a modem, a switch, or a router. The classical processor 126 may be configured to send and receive data using the server I/O interfaces 124. The server I/O interfaces 124 may be configured to use any suitable type of communication protocol. In some embodiments, the server I/O interfaces 124 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The classical processor 126 comprises one or more processors communicatively coupled to the memory 130. The classical processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The classical processor 126 may be a programmable logic device, a microcontroller, a microprocessor, or any suitable combination of the preceding. The one or more classical processor 126 are configured to process data and may be implemented in hardware or software executed by hardware. For example, the classical processor 126 may be 8-bit, 16-bit, 32-bit, 64-bit or of any other suitable architecture. The classical processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more classical processor 126 are configured to execute various instructions. For example, the one or more classical processor 126 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the server I/O interfaces 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 124 may be configured to support any suitable type of communication protocol as would be appreciated by one of ordinary skill in the art. In one or more embodiments, the server I/O interfaces 124 may comprise one or more sensors configured to evaluate physical phenomena surrounding the server 102 and/or one or more of the user devices 110. The sensors may be proximity sensors, optical sensors, and the like.

The quantum processor 128 may comprise one or more quantum processors operably coupled to the memory 30. The quantum processor 128 may be configured to process quantum bits. The quantum processor 128 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements quantum bits with states of a respective quantum system. The quantum processor 128 may be configured to execute one or more quantum algorithms (as part of the one or more instructions 132) to perform one or more functions described herein.

The quantum processor 128 may be configured to implement a quantum algorithm (e.g., Grover's search algorithm) to execute one or more of the QRNG operations 144. The quantum processor 128 may be configured to initialize one or more qubits (not shown). In certain embodiments, the quantum processor 128 may instruct the converter 118 to initialize the qubits. The quantum processor 128 may be configured to apply a Hadamard operator to the qubits to generate an initial quantum state. The quantum processor 128 applies an oracle operator and a diffusion operator to a current quantum state (e.g., initial quantum state). In certain embodiments, the oracle operator comprises a Pauli X gate.

The quantum processor 128 may determine if the oracle and diffusion operators are applied to the initial quantum state for a threshold number of times. In certain embodiments, the oracle and diffusion operators may be applied to the initial quantum state one or more times until the oracle and diffusion operators are applied to the initial quantum state for the threshold number of times.

In response to determining that the oracle and diffusion operators are applied to the initial quantum state for the threshold number of times, the quantum processor 128 may be configured to identify the current quantum state as a final quantum state. The quantum processor 128 may be configured to measure the final quantum state to determine one or more values as part of the QRNG operations 144. In certain embodiments, the quantum processor 128 may be configured to instruct the converter 118 to measure the final quantum state.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, one or more received data streams 134 comprising structured data 136 and structured data 138, one or more data abbreviation operations 104, one or more roadmaps 140, one or more containerized cluster operations 142, one or more (QRNG) operations 144, one or more sets of datapoints 146, one or more requests, user information 150 comprising one or more user profiles 152 and one or more entitlements 154, one or more indexed data 156, one or more artificial intelligence (AI) commands 158, one or more machine learning (ML) algorithms 160 configured to train one or more ML models 162, one or more rules and policies 164, one or more depiction analysis operations 166, one or more text analysis operations 168, and one or more reports 170. The instructions 132 may comprise any suitable set of instructions, logic, rules, or code operable to execute the classical processor 126. Further, the instructions 132 may comprise the one or more quantum algorithms comprising any suitable set of software instructions, logic, rules, or code operable to be executed by the quantum processor 128.

The data abbreviation operations 104 may be one or more operations configured to abbreviate (e.g., reduce and/or descale) one or more data packets received in one or more received data streams 134. Further, the one or more data abbreviation operations 104 may be one or more operations configured to convert one or more of the structured data 136 and/or the unstructured data 138 into one or more of the indexed data 156 in accordance with the one or more requests 148. The one or more requests 148 may be one or more information strings, alphanumeric data, and/or configuration commands to be exchanged in a data network. The one or more requests 148 may be configured to trigger one or more of the data abbreviation operations 104. The requests 148 may be exchanged in bulk or individually over the network 112.

The requests 148 may be one or more communications configured to provide triggers in the form of communication or control signals to start operations such as fetching the instructions 132 or running one or more of data abbreviation operations 104. The requests 148 may provide user information 150 to the server 102 to indicate at least one user profile 152 associated with one or more of the entitlements 154 to access and/or modify any of the services available in the server 102. In some embodiments, the requests 148 may be configured to provide lists, security information, and configuration commands that the server 102 uses to set up a specific service for one of the user devices 110. The requests 148 may comprise data that provides starting procedure configuration to the server 102. In one or more embodiments, the requests 148 may be optimized instructions that trigger establishing of a specific procedure in the server 102.

In one or more embodiments, the data abbreviation operations 104 are configured to create, analyze, manage, and update one or more data packets of the received data streams 134. The data abbreviation operations 104 may be configured to communicate one or more of the requests 148 with the one or more user devices 110 via user and/or network interfaces and connections. The data abbreviation operations 104 may be configured to perform one or more of the operations in the process 200 described in reference to FIG. 2. In some embodiments, the data abbreviation operations 104 may be configured to update one or more user profiles 152 in the user information 150. In some embodiments, the server 102 may be configured to generate the one or more roadmaps 140 as a result of executing one or more of the data abbreviation operations 104.

In one or more embodiments, the data abbreviation operations 104 may be one or more operations configured to be performed at multiple locations. The data abbreviation operations 104 may be operations distributed to exchange one or more data objects associated with one or more user devices 110. The data abbreviation operations 104 may be distributed in multiple locations physically separated from one another. The data abbreviation operations 104 may be testing operations performed to evaluate one or more portions of application data associated with one or more of the services. The data abbreviation operations 104 may be configured to separate the structured data 136 and the unstructured data 138 in data packets received in the received data streams 134. Upon identifying and separating the different types of data, the data abbreviation operations 104 may be configured to generate one or more roadmaps 140 comprising the one or more depiction analysis operations 166 and/or the one or more text analysis operations 168. The roadmaps 140 may be plans to convert the different data types into the indexed data 156. The indexed data 156 may be one or more representative datapoints 146 associated with the structured data 136 and/or the unstructured data 138. The data abbreviation operations 104 may be triggered upon executing one or more ML algorithms 160. The data abbreviation operations 104 may be configured to store unique versions of the indexed data to prevent redundancy and/or duplication of the representative data.

The user information 150 may comprise the one or more user profiles 152, one or more entitlements 154, and one or more services. In one or more embodiments, the user profiles 152 may comprise multiple profiles associated with one or more entitlements 154 to access and/or modify the services. Each of the user profiles 152 may be associated with one or more entitlements 154. The entitlements 154 may indicate that a given user device 110 is allowed to access one or more network resources in accordance with the one or more rules and policies 164. The entitlements 154 may indicate that a given user device 110 is allowed to perform one or more operations in the system 100 (e.g., provide a specific application data access to one of the users 116). To secure or protect operations of the user devices 110 from bad actors, the entitlements 154 may be assigned to a given user profile 152 in accordance with updated security information, which may provide guidance parameters to the use of the entitlements 154 based at least upon corresponding rules and policies 164. In one or more embodiments, the one or more services perform one or more application operations using the indexed data 156. In some embodiments, the user profiles 152 may comprise multiple profiles for the users 116. Each user profile 152 may comprise one or more entitlements 154. As described above, the entitlements 154 may indicate that a given user 116 is allowed to access one or more network resources in accordance with one or more rules and policies 164. The entitlements 154 may indicate that a given user is allowed to perform one or more data exchanges with the server 102 via the decentralized networks 106. In one or more embodiments, each of the user profiles 152 may comprise information about at least one user 116 entitled to trigger one or more data abbreviation operations 104.

The one or more received data streams 134 may be one or more data packets received from another server, one of the databases 122, the memory 130, and/or one or more of the user devices 110. The received data streams 134 may be data of different types comprising the structured data 136 and/or the unstructured data 138. The received data streams 134 may comprise information associated with one or more of the user devices 110 and/or one or more of the users 116. The structured data 136 may be one or more elements of the data packets that may be organized in a fixed data model and/or one or more discrete data fields. The structured data 136 may comprise individual image frame data, video data, and the like. Examples of the structured data 136 may comprise image files and/or video files. The unstructured data 138 may comprise one or more elements of the data packets that may not be organized in a fixed data model and/or one or more discrete data fields. The unstructured data 138 may be either textual data and/or non-textual data. Examples of the unstructured data 138 may comprise text files, social media data, website contents, text messages on mobile devices, images, audio, video files, and/or business application data.

In one or more embodiments, the server 102 may be configured to store, maintain, and analyze the data elements in the received data streams 134. The server 102 may be configured to abbreviate and store data that may comprise text and/or multimedia files. In some embodiments, the server 102 may be configured to perform the one or more data abbreviation operations as part of execution of the ML algorithms 160. In this regard, the data abbreviation operations 104 may be configured to use data compression in transmission and storage of big data to reduce network bandwidth amounts. The data abbreviation operations 104 may comprise a first type of compression operations for the structured data 136 and a second type of compression operations for the unstructured data 138.

The one or more requests 148 may be one or more communications and/or transmissions requesting for one or more of the data packets in the received data streams 134. The requests 148 may be configured to trigger one or more of the data abbreviation operations 104. The data abbreviation operations 104 may be part of operations performed by an identifier plugin configured to maintain up-to-date information about data. In this regard, information obtained from the received data streams 134 may be stored as indexed data 156 in the databases 122 and/or the memory 130. The requests 148 may trigger one or more of the analysis operations 166 and/or one or more of the text analysis operations 168 as part of the data abbreviation operations 104. The data abbreviation operations 104 may comprise the containerized cluster operations 142, the QRNG operations 144, the depiction analysis operations 166, and the text analysis operations 168. The multiple operations may be performed as part of a specific roadmap 140. The one or more roadmaps 140 may be one or more plans to perform specific operations that index the structured data 136 and/or the unstructured data 138 into the indexed data 156.

The one or more depiction analysis operations 166 may comprise evaluating the structured data 136. The depiction analysis operations 166 may be configured to derive multiple reference datapoints 146 indicative of information in the structured data 136. The depiction analysis operations 166 may trigger one or more containerized cluster operations 142 configured to separate the reference datapoints 146 in the structured data 136. The containerized cluster operations 142 may be Kubernetes (K8) operations configured to determine and group one or more similar information items in the foreground and/or the background of a given image frame. For example, an image frame comprising a brown dog on a green grassy yard in front of a red house in a clear day may be identified to have datapoints 146 representative of an animal cluster comprising a dog, an object cluster comprising a house, a plant cluster comprising grass, and a color cluster comprising brown (from the dog), green (from the grass), red (from the house), and blue (from a clear sky).

In one or more embodiments, the one or more containerized cluster operations 142 may be performed multiple times from multiple pieces of the structured data 136. The containerized cluster operations 142 may be configured to group the structured data 136 based on color, pixel size, and/or pixel density. In this regard, the datapoints 146 may be representative of individual clusters of information.

The one or more text analysis operations 168 may comprise evaluating the unstructured data 138. The text analysis operations 168 may be configured to derive multiple reference datapoints 146 indicative of information in the unstructured data 138. The text analysis operations 168 may trigger one or more QRNG operations 144 configured to retrieve datapoints 146 representative of the unstructured data 138. The QRNG operations 144 may be quantum operations performed by the quantum processor 128 configured to store quantum states of the datapoints 146. For example, a text string comprising the word "EXAMPLE" may be identified to have datapoints 146 representative of two instances of the letter "E," and one instance of each of the letters "X," "A," "M," "P," and "L." The datapoints 146 from text in the unstructured data 138 may be stored along a corresponding occurrence while irrespective of a position occurrence.

In one or more embodiments, the one or more QRNG operations 144 may be performed multiple times from multiple pieces of the unstructured data 138. The QRNG operations 144 may be configured to group individual elements (e.g., individual letters in text strings) of the unstructured data 138 based on symbols and/or alphanumeric characters used. In this regard, the datapoints 146 may be representative of individual elements.

In one or more embodiments, the data abbreviation operations 104 may be configured to analyze the structured data 136 and/or the unstructured data 138. Based on the analyses, the containerized cluster operations 142 may be performed by the classical processors 126 to ensure that every datapoint 146 gets uniquely indexed as indexed data 156. Further, based on the analyses, the QRNG operations 144 may be performed by the quantum processors 128 to ensure that every datapoint 146 gets a unique number even when row counts of input source outreach a system limit.

In one or more embodiments, the server 102 is configured to improve data storage operations by reducing the size of the data received at the received data streams 134 to the indexed data 156.

In one or more embodiments, the reports 170 comprise one or more communications and/or transmissions configured to provide information relating to a status of one or more of the data abbreviation operations 104. The reports 170 may comprise and/or trigger alerts to other servers and/or one or more of the user devices 110.

The QRNG operations 144 may not rely on mathematical algorithms but on laws of quantum physics to generate true random numbers and provide high security. Every alphanumeric data which is available in a source assign with true random number may make data entry unique. The QRNG operations 144 may comprise setting up qubits (Quantum bits) that exists in one of two alternative binary digits. The qubits may be used to store the datapoints 146 as part of the QRNG operations 144. In some embodiments, quantum processor 128 may be configured to identify a true value of the qubits.

In one or more embodiments, the ML algorithms 160 may be executed by the classical processor 126 to evaluate the data exchange requests 148. Further, the ML algorithms 160 may be configured to interpret and transform the requests 148 and/or the instructions 132 into structured data sets and subsequently stored as files or tables. The ML algorithms 160 may cleanse, normalize raw data, and derive intermediate data to generate uniform data in terms of encoding, format, and data types. The ML algorithms 160 may be executed to run user queries and advanced analytical tools on the structured data and/or the unstructured data in accordance with one or more ML models 162. The ML algorithms 160 may be configured to generate the one or more AI commands 158 based on one or more results of the testing operations. The AI commands 158 may be parameters that proactively trigger one or more of the data abbreviation operations 104 to store one or more data packets in the received data streams 134 to the indexed data 156. The AI commands 158 may be combined with the existing instructions 132 to dynamically trigger and/or perform the data abbreviation operations 104. The AI commands 158 may be configured to trigger one or more cognitive AI operations in accordance with one or more ML models 162. The ML models 162 may be trained by the one or more ML algorithms 160 based on historic information associated with any data abbreviation operations 104 performed with the server 102.

The rules and policies 164 may be security configuration commands or regulatory operations predefined by an organization or one or more users 116. In one or more embodiments, the rules and policies 164 may be dynamically defined by the one or more users 116. The rules and policies 164 may be prioritization rules configured to instruct one or more user devices 110 to perform one or more evaluating operations or perform one or more operations in the system 100 in a specific data abbreviation operation 104. The one or more rules and policies 164 may be predetermined or dynamically assigned by a corresponding user 116 or an organization associated with the users 116.

In one or more embodiments, the databases 122 may be one or more repositories configured to store information. In one example, the server 102 may determine the classical processor 126 and/or the quantum processor 128 are available (e.g., running) to perform a specific service. In another example, the server 102 may determine that a specific managed server is running to enable a testing application and/or perform the specific service upon receiving a server response indicating that a corresponding managed server is available to perform the service. The databases 122 may be configured to store one or more representations of data instead of storing coded data. In this regard, the representations may be encoded in accordance with an encoder configured to identify and/or verify exchanged information. For example, the databases 122 may comprise one or more representations of the datapoints 146. As the datapoints 146 are obtained, the classical processor 126 may be configured to compare the datapoints 146 with a representation of a previous version for a specific user 116.

User Device

In one or more embodiments, each of the user devices 110 (e.g., the user device 110a, the user devices 110b-110d in the user device group 114a, and/or the user devices 110e-110g in the user device group 114b) may be any computing device configured to communicate with other devices, such as the server 102, other user devices 110 in the user device groups 114, databases, and the like in the system 100. Each of the user devices 110 may be configured to perform specific functions described herein and interact with the server 102 and/or any other user devices 110. Examples of the user devices 110 comprise, but are not limited to, a laptop, a computer, a smartphone, a tablet, a smart device, an IoT device, a simulated reality device, an augmented reality device, or any other suitable type of device. The requests 148 may be provided by the user devices 110 via one or more interfaces comprising input displays, voice microphones, or sensors capturing gestures performed by a corresponding user 116.

The user devices 110 may be hardware configured to create, transmit, and/or receive information. The user devices 110 may be configured as a provider node or as worker nodes. The user devices 110 may be configured to receive inputs from a user, process the inputs, and generate data information or command information in response. The data information may include documents or files generated using a graphical user interface (GUI).

Referring to the user device 110a as a non-limiting example, the command information may include input selections/commands triggered by a user using a peripheral component or one or more device peripherals 184 (i.e., a keyboard) or an integrated input system (i.e., a touchscreen displaying the GUI). The user devices 110 may be communicatively coupled to the server 102 via a network connection (i.e., the device peripherals 184). The user devices 110 may transmit and receive data information, command information, or a combination of both to and from the server 102 via the device interfaces 182. In one or more embodiments, the user devices 110 are configured to exchange data, commands, and signaling with the server 102. In some embodiments, the user devices 110 are configured to receive at least one security system configuration from the server 102 to implement a security system (one of the one or more local applications 192) at one of the user devices 110.

In one or more embodiments, the device interfaces 182 may be any suitable hardware or software (e.g., executed by hardware) to facilitate any suitable type of communication in wireless or wired connections. These connections may comprise, but not be limited to, all or a portion of network connections coupled to additional user devices 110, the server 102, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the user devices 110. For example, the one or more device peripherals 184 may be speakers configured to release audio signals (e.g., voice signals or commands) during media playback operations. In another example, the one or more device peripherals 184 may be microphones configured to capture audio signals. In one or more embodiments, the one or more device peripherals 184 may be configured to operate continuously, at predetermined time periods or intervals, or on-demand.

The device processor 186 may comprise one or more processors communicatively coupled to and in signal communication with the device interfaces 182, the device peripherals 184, and the device memory 188. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 may comprise an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions.

The device memory 188 may comprise multiple operation data and one or more local applications 192 associated with the server 102. The operation data may be data configured to enable one or more data processing operations such as those described in relation with the server 102. The operation data may be partially or completely different from those comprised in the memory 130. The local applications 192 may be one or more of the services described in relation with the server 102. In some embodiments, the local applications 192 may be partially or completely different from those comprised in the memory 130.

Network

The network 112 facilitates communication between and amongst the various devices of the system 100. The network 112 may be any suitable network operable to facilitate communication between the server 102 and the user devices 110 of the system 100. The network 112 may include any interconnecting system capable of transmitting audio, video, signals, data, data packets, messages, or any combination of the preceding. The network 112 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Operational Flow The data abbreviation operations 104 may comprise constructing an intelligent platform using QRNG probability, quantum decision-making, and containerization technology. The data abbreviation operations 104 may distinguish requested data from large-scale dataset and perform intelligent compression on large datasets. In some embodiments, an initial stage of data screening may eliminate any overburden from the server 102 by selectively generating the roadmaps 140 for different types of data. If the data is of an image type, then an intelligent depiction analyzer may convert an image into pixels measured in distance. For example, if there are only 3 colors in the image, then each color pixel distance and lengths between each color distance may be measured and stored as corresponding datapoints 146. In some embodiments, if the distance is a minor distance then the server 102 may be configured to not act on reducing and/or compressing the data. If the distance is equal to or above a predefined threshold, the server 102 may be configured to reduce and/or compress the distance without changing the image. As an example, reducing color lengths in the image may not modify the image because having a same color for a long distance may not add any value to the image.

In one or more embodiments, the server 102 may be configured to train the ML model 162 to generate one or more depiction plans over time. The ML model 162 may be trained to identify data in an image (e.g., unstructured data 138), assort the data in clusters of information (e.g., as part of the containerized cluster operations 142), and prevent repeated data from being saved in the clusters. The ML model 162 may be executed to generate depiction plans performing one or more depiction analysis operations 166 that identify datapoints 146 in images for storage. In this regard, the server 102 may be configured to store reference data (e.g., datapoints 146) representative of the image data and does not need to store the actual data. The datapoints 146 may include content information, colors in the image data, and pixel density information, among others.

In one or more embodiments, the server 102 may be configured to train the ML model 162 to generate one or more text plans over time. The ML model 162 is trained to identify data in text strings (e.g., structured data 136), assort the data in quantum registers (e.g., as part of the QRNG operations 144), and prevent repeated data from being saved in the registers. The ML model 162 may be executed to generate text plans that identify datapoints 146 in text for storage. In this regard, the server 102 may be configured to store reference data (e.g., datapoints 146) representative of the text data and does not need to store the actual data. The datapoints 146 may include content information in the form of numbers.

In one or more embodiments, the server 102 may be configured to filter information in the one or more received data streams 134 for processing. The received data streams 134 may include image data and/or text data. Each time the received data streams 134 is received, the server 102 determines whether the received data streams 134 comprises structured data 136 and/or unstructured data 138 based on content. The server 102 may comprise an identifier plugin configured to separate structured data 136 and unstructured data 138. Upon separating the received data streams 134 into the structured data 136 and/or the unstructured data 138, the identifier plugin is configured to provide the different types of data to specific analyzers configured to selectively store the data in accordance with a depiction plan following one or more depiction analysis operations 166 and a text plan following one or more text analysis operations 168. The identifier plugin may be configured to receive feedback from the specific analyzers and determines whether datapoints 146 in the structured data 136 and the unstructured data 138 are unique. In this case, the identifier plugin is configured to store the datapoints 146 in association with the structured data 136 and/or the unstructured data 138. In this regard, memory resources and processing resources are greatly saved by a feedback loop provided via the identifier plugin as data is determined to be unique for storage as soon as the contents are identified.

Example Process to Dynamically Abbreviate Data

FIG. 2 illustrates an example flowchart of a process 200 configured to dynamically abbreviate data, in accordance with one or more embodiments. Modifications, additions, or omissions may be made to the process 200. The process 200 may comprise more, fewer, or other operations than those shown in FIG. 2. For example, operations may be performed in parallel or in any suitable order. While at times discussed as the server 102, the user devices 110, or components of any of thereof performing operations described in operations 202-232 in the process 200, any suitable system or components of the system 100 may perform one or more operations of the process 200. For example, one or more operations of the process 200 may be implemented, at least in part, in the form of instructions 132 of FIG. 1, stored on non-transitory, tangible, machine-readable media (e.g., a non-transitory computer readable medium such as server memory 130 of FIG. 1) that when run by one or more processors (e.g., the classical processor 126 of FIG. 1) may cause the one or more processors to perform operations described in operations 202-232.

The process 200 starts at operation 202, where the server 102 receive a request 148 to store received data from the received data streams. At operation 204, the server 102 is configured to determine whether the received data comprises unstructured data 138. At operation 206, the server 102 is configured to determine whether the received data comprises structured data 136. At operation 208, the server 102 is configured to separate the structured data 136 and/or the unstructured data 138.

At operation 212, the server 102 is configured to evaluate the unstructured data 138 in accordance with one or more ML algorithms 160. In some embodiments, in response to determining that the received data comprises the unstructured data 138, the server 102 may be configured to evaluate the unstructured data 138 of the received data in accordance with the ML algorithm 160. The unstructured data 138 may comprise textual data. The textual data may comprise one or more letters. For example, textual data may comprise a first letter and a second letter. Further, a signature representation of the unstructured data 138 of the received data may comprise values indicating instances of the first letter in the textual data and values indicating instances of the second letter in the textual data. At operation 214, the server 102 is configured to perform one or more text analysis operations 168 to identify datapoints 146 in the unstructured data 138. In response to evaluating the unstructured data 138 of the received data, the server 102 is configured to perform an analysis operation (e.g., the one or more QRNG operations 144) to identify the datapoints 146 in the received data. The datapoints 146 may be a signature representation of the unstructured data 138 of the received data. At this stage, the server 102 may be configured to generate a roadmap 140 to store the datapoints 146. At operation 216, the server 102 is configured to generate a text roadmap to store the datapoints 146 in accordance with the one or more QRNG operations 144. The roadmap 140 is a plan to store the datapoints 146 in the memory 130 in accordance with one or more QRNG operations 144. The one or more QRNG operations 144 are configured to convert the datapoints 146 into one or more intermediate values. The one or more QRNG operations 144 may be configured to index the plurality of intermediate values as indexed data 156.

At operation 222, the server 102 is configured to evaluate the structured data 136 in accordance with one or more ML algorithms 160. In some embodiments, in response to determining that the second received data comprises the structured data 136, the server 102 may be configured to evaluate the structured data 136 of the received data in accordance with the ML algorithm 160. The structured data 136 may comprise image data. The image data may comprise pixels associated with a first color and pixels associated with a second color. Further, a signature representation of the structured data 136 of the second received data may comprise a first pixel density of the first color and a second pixel density of the second color. At operation 224, the server 102 is configured to perform one or more depiction analysis operations 166 to identify datapoints 146 in the structured data 136. In response to evaluating the structured data 136 of the received data, the server 102 may be configured to perform an analysis operation (e.g., the one or more containerized cluster operations 142) to identify the datapoints 146 in the received data. The datapoints 146 may be a signature representation of the structured data 136 of the received data. At this stage, the server 102 may be configured to generate a roadmap 140 to store the datapoints 146. At operation 226, the server 102 is configured to generate a depiction roadmap to store the datapoints 146 in accordance with the one or more containerized cluster operations 142. The roadmap 140 is a plan to store the datapoints 146 in the memory 130 in accordance with one or more containerized cluster operations 142. The one or more containerized cluster operations 142 may be configured to cluster the datapoints 146 into one or more clusters. The one or more containerized cluster operations 142 may be configured to index the plurality of clusters as indexed data 156. The image data may comprise a first object and a second object. The signature representation of the structured data 136 of the received data may comprise instances of the first object in the image data and instances of the second object in the image data.

The process 200 may end at operation 232, where the server 102 may be configured to store the datapoints 146 in accordance with the text roadmap and/or the depiction roadmap. In one or more embodiments, the server 102 is configured to determine the received data from the received data streams comprise unstructured data 138 and structured data 136. Further, the server 102 may be configured to separate the unstructured data 138 and the structured data 136. In response to determining that the received data comprises the unstructured data 138 and the structured data 136, the server 102 may be configured to evaluate the unstructured data 138 and the structured data 136 of the received data in accordance with the ML algorithm 160. In response to evaluating the unstructured data 138 and the structured data 136 of the received data, the server 102 is configured to perform one or more analysis operations to identify one or more datapoints 146 in the received data. The datapoints 146 may be one or more signature representations of the unstructured data 138 and the structured data 136 of the received data. The server 102 may be configured to generate one or more roadmaps 140 to store the datapoints 146. The roadmaps 140 may be one or more plans to store the datapoints 146 in the memory 130 in accordance with one or more containerized cluster operations 142 and/or one or more the QRNG operations 144.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
 a memory operable to store:
  a machine learning algorithm configured to evaluate data in accordance with one or more machine learning models:
 at least one classical processor communicatively coupled to the memory and configured to:
  receive a first request to store first received data;
  determine that the first received data comprises first unstructured data:
  in response to determining that the first received data comprises the first unstructured data, assort, using a trained machine learning algorithm trained to abbreviate data, contents of the first unstructured data of the first received data into a plurality of clusters, each cluster of the plurality of clusters being representative of a type of content in the first unstructured data;
  in response to assorting, using the trained machine learning algorithm, the first unstructured data of the first received data, perform a first analysis operation to identify a first plurality of datapoints representative of the plurality of clusters, the first plurality of datapoints being a first signature representation of the first unstructured data of the first received data; and
  generate a first roadmap to store the first plurality of datapoints,
   the first roadmap being a plan to store the first plurality of datapoints in the memory in accordance with one or more quantum random number generator (QRNG) operations; and at least one quantum processor communicatively coupled to the at least one classical processor and configured to:

convert, as part of the one or more QRNG operations, the first plurality of datapoints into a plurality of random intermediate values;

index, as part of the one or more QRNG operations, the plurality of random intermediate values as first indexed data; and after completion of the first roadmap, store the first plurality of datapoints as the first indexed data.

2. The system of claim 1, wherein the first unstructured data comprises textual data.

3. The system of claim 2, wherein:

the textual data comprises a first letter and a second letter; and the first signature representation of the first unstructured data of the first received data comprises a first plurality of numbers indicating instances of the first letter in the textual data and a second plurality of numbers indicating instances of the second letter in the textual data.

4. The system of claim 1, wherein:

the at least one classical processor is further configured to:

receive a second request to store second received data;

determine that the second received data comprises first structured data:

in response to determining that the second received data comprises the first structured data, assort, using the trained machine learning algorithm trained to abbreviate data, contents of the first structured data of the second received data into an additional plurality of clusters, each cluster of the additional plurality of clusters being representative of an additional type of content in the first unstructured data;

in response to assorting, using the trained machine learning algorithm, the first structured data of the second received data, perform a second analysis operation to identify a second plurality of datapoints representative of the additional plurality of clusters, the second plurality of datapoints being a second signature representation of the first structured data of the second received data; and generate a second roadmap to store the second plurality of datapoints, the second roadmap being a plan to store the second plurality of datapoints in the memory in accordance with one or more containerized cluster operations; and the at least one quantum processor is further configured to:

cluster the second plurality of datapoints into a plurality of clusters; and index the additional plurality of clusters as second indexed data; and after completion of the first roadmap, store the second plurality of datapoints as the second indexed data.

5. The system of claim 4, wherein the first structured data comprises image data.

6. The system of claim 5, wherein:

the image data comprises a first plurality of pixels associated with a first color and a second plurality of pixels associated with a second color; and the second signature representation of the first structured data of the second received data comprises a first plurality of numbers indicating a first pixel density of the first color and a second plurality of numbers indicating a second pixel density of the second color.

7. The system of claim 5, wherein:

the image data comprises a first object and a second object; and the second signature representation of the first structured data of the second received data comprises a first plurality of numbers indicating instances of the first object in the image data and a second plurality of numbers indicating instances of the second object in the image data.

8. The system of claim 1, wherein the at least one classical processor is further configured to:

receive a second request to store second received data;

determine that the second received data comprises second unstructured data and structured data;

separate the second unstructured data and the structured data;

in response to determining that the second received data comprises the second unstructured data, evaluate the second unstructured data of the second received data in accordance with the machine learning algorithm;

in response to evaluating the second unstructured data of the second received data, perform a second analysis operation to identify a second plurality of datapoints in the second received data, the second plurality of datapoints being a second signature representation of the second unstructured data of the second received data;

generate a second roadmap to store the second plurality of datapoints, wherein:

the second roadmap is a plan to store the second plurality of datapoints in the memory in accordance with one or more containerized cluster operations;

the one or more containerized cluster operations are configured to cluster the second plurality of datapoints into a plurality of clusters; and the one or more containerized cluster operations are configured to index the plurality of clusters as second indexed data:

cause the quantum processor to store the second plurality of datapoints following the second roadmap;

in response to determining that the second received data comprises the structured data, evaluate the structured data of the second received data in accordance with the machine learning algorithm;

in response to evaluating the structured data of the second received data, perform a third analysis operation to identify a third plurality of datapoints in the second received data, the third plurality of datapoints being a third signature representation of the structured data of the second received data: generate a third roadmap to store the third plurality of datapoints, wherein:

the third roadmap is a plan to store the third plurality of datapoints in the memory in accordance with one or more QRNG operations;

the one or more QRNG operations are configured to convert the third plurality of datapoints into a second plurality of random intermediate values; and the one or more QRNG operations are configured to index the second plurality of random intermediate values as third indexed data; and cause the quantum processor to store the third plurality of datapoints following the third roadmap.

9. The system of claim 1, wherein the at least one classical processor is further configured to:

receive a second request to store second received data;

determine that the second received data comprises second unstructured data and structured data;

separate the second unstructured data and the structured data;

in response to determining that the second received data comprises unstructured data, evaluate the second unstructured data of the second received data in accordance with the machine learning algorithm;

in response to evaluating the second unstructured data of the second received data, perform a second analysis operation to identify a second plurality of datapoints in the second received data, the second plurality of datapoints being a second signature representation of the second unstructured data of the second received data;

generate a second roadmap to store the second plurality of datapoints, wherein:
   the second roadmap is a plan to store the second plurality of datapoints in the memory in accordance with one or more containerized cluster operations;
   the one or more containerized cluster operations are configured to cluster the second plurality of datapoints into a plurality of clusters; and
   the one or more containerized cluster operations are configured to index the plurality of clusters as second indexed data:

in conjunction with generating the second roadmap to store the second plurality of datapoints, determine that the second plurality of datapoints is not previously stored in the memory;

in response to determining that the second plurality of datapoints is not previously stored in the memory, cause the quantum processor to store the second plurality of datapoints following the second roadmap;

in response to determining that the second received data comprises structured data, evaluate the structured data of the second received data in accordance with the machine learning algorithm;

in response to evaluating the structured data of the second received data, perform a third analysis operation to identify a third plurality of datapoints in the second received data, the third plurality of datapoints being a third signature representation of the structured data of the second received data; in response to performing the third analysis operation to identify the third plurality of datapoints in the second received data, determine that the third plurality of datapoints is previously stored in the memory; and in response to determining that the third plurality of datapoints is previously stored in the memory, generate a report indicating that the third plurality of datapoints are previously stored in the memory.

10. A method, comprising:

receiving a first request to store first received data;

determining that the first received data comprises first unstructured data;

in response to determining that the first received data comprises the first unstructured data, assorting, using a trained machine learning algorithm trained to abbreviate data, contents of the first unstructured data of the first received data into a plurality of clusters, each cluster of the plurality of clusters being representative of a type of content in the first unstructured data;

in response to assorting, using the trained machine learning algorithm, the first unstructured data of the first received data, performing a first analysis operation to identify a first plurality of datapoints representative of the plurality of clusters, the first plurality of datapoints being a first signature representation of the first unstructured data of the first received data; and generate a first roadmap to store the first plurality of datapoints,
   the first roadmap being a plan to store the first plurality of datapoints in accordance with one or more quantum random number generator (QRNG) operations:

convert, as part of the one or more QRNG operations, the first plurality of datapoints into a plurality of random intermediate values;

index, as part of the one or more QRNG operations, the plurality of random intermediate values as first indexed data; and after completion of the first roadmap, storing the first plurality of datapoints as the first indexed data.

11. The method of claim 10, wherein the first unstructured data comprises textual data.

12. The method of claim 11, wherein:
   the textual data comprises a first letter and a second letter; and
   the first signature representation of the first unstructured data of the first received data comprises a first plurality of numbers indicating instances of the first letter in the textual data and a second plurality of numbers indicating instances of the second letter in the textual data.

13. The method of claim 10, further comprising:

receiving a second request to store second received data;

determining that the second received data comprises first structured data;

in response to determining that the second received data comprises the first structured data, evaluating assorting, using the trained machine learning algorithm trained to abbreviate data, contents of the first structured data of the second received data into an additional plurality of clusters, each cluster of the additional plurality of clusters being representative of an additional type of content in the first unstructured data;

in response to assorting, using the trained machine learning algorithm, the first structured data of the second received data, performing a second analysis operation to identify a second plurality of datapoints representative of the additional plurality of clusters, the second plurality of datapoints being a second signature representation of the first structured data of the second received data;

generate a second roadmap to store the second plurality of datapoints,
   the second roadmap being a plan to store the second plurality of datapoints in accordance with one or more containerized cluster operations:

cluster the second plurality of datapoints into a plurality of clusters; and index the additional plurality of clusters as second indexed data; and after completion of the second roadmap, storing the second plurality of datapoints as the second indexed data.

14. The method of claim 13, wherein the first structured data comprises image data.

15. The method of claim 14, wherein:
   the image data comprises a first plurality of pixels associated with a first color and a second plurality of pixels associated with a second color; and
   the second signature representation of the first structured data of the second received data comprises a first plurality of numbers indicating a first pixel density of the first color and a second plurality of numbers indicating a second pixel density of the second color.

16. The method of claim 14, wherein:
the image data comprises a first object and a second object; and
the second signature representation of the first structured data of the second received data comprises a first plurality of numbers indicating instances of the first object in the image data and a second plurality of numbers indicating instances of the second object in the image data.

17. A non-transitory computer readable medium storing instructions that when executed by a processor cause the processor to:
receive a first request to store first received data;
determine that the first received data comprises first unstructured data;
in response to determining that the first received data comprises the first unstructured data, assort, using a trained machine learning algorithm trained to abbreviate data, contents of the first unstructured data of the first received data into a plurality of clusters, each cluster of the plurality of clusters being representative of a type of content in the first unstructured data;
in response to assorting, using the trained machine learning algorithm, the first unstructured data of the first received data, perform a first analysis operation to identify a first plurality of datapoints representative of the plurality of clusters, the first plurality of datapoints being a first signature representation of the first unstructured data of the first received data: generate a first roadmap to store the first plurality of datapoints, wherein:
the first roadmap being a plan to store the first plurality of datapoints in accordance with one or more quantum random number generator (QRNG) operations:
convert, as part of the one or more QRNG operations, the first plurality of datapoints into a plurality of random intermediate values; and
index, as part of the one or more QRNG operations, the plurality of random intermediate values as first indexed data; and
after completion of the first roadmap, store the first plurality of datapoints as the first indexed data.

18. The non-transitory computer readable medium of claim 17, wherein the first unstructured data comprises textual data.

19. The non-transitory computer readable medium of claim 17, wherein the instructions further cause the processor to:
receive a second request to store second received data;
determine that the second received data comprises first structured data;
in response to determining that the second received data comprises the first structured data, assort, using the trained machine learning algorithm trained to abbreviate data, contents of the first structured data of the second received data into an additional plurality of clusters, each cluster of the additional plurality of clusters being representative of an additional type of content in the first unstructured data;
in response to assorting, using the trained machine learning algorithm, the first structured data of the second received data, perform a second analysis operation to identify a second plurality of datapoints representative of the additional plurality of clusters, the second plurality of datapoints being a second signature representation of the first structured data of the second received data;
generate a second roadmap to store the second plurality of datapoints,
the second roadmap being a plan to store the second plurality of datapoints in accordance with one or more containerized cluster operations;
cluster the second plurality of datapoints into a plurality of clusters; and
index the plurality of clusters as second indexed data; and
after completion of the second roadmap, store the second plurality of datapoints as the second indexed data.

20. The non-transitory computer readable medium of claim 19, wherein the first structured data comprises image data.

* * * * *